United States Patent
Fischer et al.

(10) Patent No.: US 6,372,837 B1
(45) Date of Patent: Apr. 16, 2002

(54) NANOCOMPOSITE MATERIAL

(75) Inventors: Hartmut Rudolph Fischer, Mierlo; Leon Hubertus Gielgens, Utrecht, both of (NL)

(73) Assignee: Nederlandse Organisatie voor Toegepast Natuurweten Schappelijk Onderzoek TNO (NL)

( * ) Notice: Subject to any disclaimer, the term of this patent is extended or adjusted under 35 U.S.C. 154(b) by 0 days.

(21) Appl. No.: 09/582,901
(22) PCT Filed: Jan. 8, 1999
(86) PCT No.: PCT/NL99/00006
§ 371 Date: Aug. 31, 2000
§ 102(e) Date: Aug. 31, 2000
(87) PCT Pub. No.: WO99/35195
PCT Pub. Date: Jul. 15, 1999

(30) Foreign Application Priority Data

Jan. 9, 1998 (NL) .............................. 1008003

(51) Int. Cl.$^7$ ................................ C08K 3/22
(52) U.S. Cl. ............ 524/445; 524/449; 524/450; 524/451; 524/534; 524/789; 524/791; 524/856; 523/209; 523/216; 523/521
(58) Field of Search ................ 524/445, 449, 524/450, 451, 534, 789, 791, 856; 523/209, 216, 521

(56) References Cited

U.S. PATENT DOCUMENTS

| | | | |
|---|---|---|---|
| 3,539,306 A | * 11/1970 | Kumra | |
| 3,650,704 A | * 3/1972 | Kumra | |
| 4,558,102 A | * 12/1985 | Miyta | 525/348 |
| 4,810,734 A | 3/1989 | Kawasumi et al. | 523/216 |
| 4,814,364 A | 3/1989 | Yoshizaki et al. | 523/100 |
| 4,889,885 A | * 12/1989 | Usuki et al. | 524/445 |
| 5,554,670 A | * 9/1996 | Giannelis et al. | 523/209 |
| 5,658,653 A | 8/1997 | Bosnysk et al. | 428/328 |
| 5,728,363 A | * 3/1998 | Martin et al. | 423/593 |
| 5,728,364 A | * 3/1998 | Martin et al. | 423/593 |
| 5,728,366 A | * 3/1998 | Martin et al. | 423/593 |
| 5,776,424 A | * 7/1998 | Martin et al. | 423/593 |

FOREIGN PATENT DOCUMENTS

| WO | WO 93/11190 | 6/1993 |
|---|---|---|
| WO | WO 96/08526 | 3/1996 |
| WO | WO 99/07790 | 2/1999 |
| WO | WO 99/35186 | 7/1999 |
| WO | WO-99/47598 A1 * | 9/1999 |

OTHER PUBLICATIONS

Titulaer, HT., et al., *The Formulation of Ice Between Hydrotalcite Particles Measured by Thermoporometry*, Clay Minerals (1996) 31, 263–277.

Yun, S.K., et al. *Water Content and Particle Texture Synthetic Hydrotalcite Layered Double Hydroxides*, Chemical Matter (1995), 7, 348–354.

Tagaya, H., et al. *Preferential Intercalation of Isomers of Naphthalenecarboxylate Ions into the Interlayer of Layered Double Hydroxides*, Chm. Matter (1993), 5, 1431–1433.

Kopka, H., et al. *Anionic Surfactants between Double Metal Hydroxide Layers*, Journal of Colloid and Interface Science, vol. 123, No. 2, Jun. 1988.

Database WPI Section Ch. Week 8043 Dewwent Publications Ltd., London, GB;, AN 80–75845 C XP002061067 & JP 116743 A (Asahi Dow Ltd), Sep. 8, 1980.

Database WPI Section Ch. Week 9411 Dewwent Publications Ltd., London, GB; AN 94–087311 XP002061068 & JP 06 037212 A (Toray Ind Inc) Feb. 10, 1994.

Miyata, S., *Anion–Exchange Properties of HydrotalciteLike Compounds*, Clay and Clay Minerals, vol. 31, No. 4, 305–311 (1983).

* cited by examiner

*Primary Examiner*—Margaret Medley
(74) *Attorney, Agent, or Firm*—Roberts & Mercanti, LLP

(57) ABSTRACT

The invention relates to a method for preparing a nanocomposite material based on a polymeric matrix and a layered double hydroxide, comprising the steps of: a) providing a layered double hydroxide which contains an amount of anions of at least 20%, based on the total number of anions of the layered double hydroxide, which anions are compatible and/or reactive with the polymeric matrix: b) mixing the layered double hydroxide with a monomeric material for forming the polymeric matrix, in an amount such that the polymeric matrix is present in the nanocomposite material in an amount of at least 50% by weight, based on the nanocomposite material; c) polymerizing the monomeric material to form the polymeric matrix. The invention further relates to a nanocomposite material obtainable by such method and to a shaped article manufactured from such nanocomposite material.

15 Claims, No Drawings

NANOCOMPOSITE MATERIAL

This application is a 371 of PCT/NL99/000066 dated Jan. 8, 1999.

The invention invention relates to a nanocomposite material, a method for the preparation of a nanocomposite material and to a shaped article of a nanocomposite material.

Over the past decades, it hag already been frequently proposed to improve the properties of polymeric materials by incorporating a certain amount of a clay in those materials. The presence of a clay in a polymeric material is beneficial particularly to properties such as the mechanical strength and the heat resistance of the polymeric material.

To thus obtain a nanocomposite material that has the desired properties, it is important that the clay be dispersed in the polymeric material sufficiently homogeneously. This is not easy because the clay and the polymeric material are of a highly different nature. Polymers constitute a normally non-polar, organic material, whereas the clay is a much more polar, inorganic material. Due to this difference, the materials exhibit poor miscibility with respect to each other; they are intrinsically non-miscible. In the literature, it has been proposed first to modify the clay in different ways before it is mixed with a polymeric material. It has also been proposed to modify the clay and then to mix it with a monomeric material, which is thereupon polymerized in the presence of the clay.

In U.S. Pat. Nos. 4,889,885 and 4,810,734, it is described how a cationic clay is first modified with a swelling agent, which increases the interlayer distance of the clay structure. Used as swelling agents are surfactants, with a head group formed by an ammonium, pyridinium, sulfonium or phosphonium group, and one or more non-polar tails. The cationic head group of the surfactant is exchanged with cations between the crystalline layers of the clay and the tails should be compatible with the polymeric material. Then the modified clay is mixed with monomeric material, which can enter into a bonding interaction with the tails-of the swelling agent. When, finally, the monomeric material is then polymerized, the polymers are formed between the layers of the clay and a nanocomposite material is obtained.

A disadvantage of these known nanocomposite materials is that the quality of the end product is very highly dependent on the quality of the clay used. Cationic clay is virtually always a natural product, which is not homogeneous in composition. This inhomogeneity of the clay leads to inhomogeneities in the composition of the nanocomposite material, which means that the desired properties are not always achieved in a sufficient quality. It is therefore desirable to make it possible to incorporate into polymeric material a kind of clay that has a better controllable quality and composition.

U.S. Pat. No. 5,658,653 describes a polymer composite comprising a polymeric matrix in which a filler is incorporated. The polymeric matrix can be a polyolefin, polystyrene, polyurethane, epoxy resin, polyimide, polyacetal, polyester, polyvinyl, polyether or polyacryl. The filler is a mixed metal hydroxide that satisfies a specific formula.

In order to enhance the compatibility of the polymeric material and the filler, the surface of the filler has been modified in that particular groups have been provided thereon. These groups can be, for instance, organic acids, salts of sulfonic acids or phosphonic acids. It is also possible that anions of the filler have been exchanged with groups that form hydrogen bridges with the polymeric matrix.

A disadvantage of the material described in the above U.S. patent specification is that the filler is not homogeneously dispersed in the polymeric matrix. This inhomogeneity is presumably due to the fact that only the surface of the filler is modified.

The object of the present invention is to provide a method for preparing a nanocomposite material comprising a polymeric matrix in which a clay is incorporated, which nanocomposite material is very homogeneous in composition. It is further contemplated for the clay to be of a kind that has a properly controllable quality and composition.

According to the invention, these objects are achieved by mixing a layered double hydroxide with monomeric material and polymerizing this in the presence of the layered double hydroxide. Layered double hydroxides are anionic clays, which, surprisingly, have presently been found to be modifiable so as to allow of homogeneous dispersion in a polymeric material.

Accordingly, the invention relates to a method for preparing a nanocomposite material based on a polymeric matrix and a layered double hydroxide, comprising the steps of a) providing a layered double hydroxide which contains an amount of anions of at least 20%, based on the total number of anions of the layered double hydroxide, which anions are compatible and/or reactive with the polymeric matrix;

b) mixing the layered double hydroxide with a monomeric material for forming the polymeric matrix, in an amount such that the polymeric matrix is present in the nanocomposite material in an amount of at least 50% by weight, based on the nanocomposite material;

c) polymerizing the monomeric material for forming the polymeric matrix.

It will be clear that the invention further relates to a nanocomposite material obtainable by the above method.

It has been found that a nanocomposite material prepared according to the present method has highly favorable properties. Thus, the heat resistance, the mechanical strength and the impact resistance of a polymeric material in which a layered double hydroxide is incorporated in accordance with the invention are strongly improved compared with the same properties of the polymeric material in which no layered double hydroxide is incorporated. It has further been found that the electrical conductivity and the permeability to gases and liquids, such as oxygen, water vapor and hydrocarbons, have been reduced to a considerable extent. Since layered double hydroxides can be prepared synthetically, it is possible, according to the invention, to prepare a nanocomposite material of a constant, controllable quality. It has furthermore been found that the in situ polymerization to form the polymeric matrix results in a very homogeneous product.

For that matter, it is known from U.S. Pat. No. 4,558,102 that a particular kind of layered double hydroxide, a hydrotalcite, can be incorporated into a halogen-containing rubber composition as an acid-acceptor to improve the water resistance of the rubber composition. Optionally, the hydrotalcite aggregates used can be modified with at most 10% by weight of a surfactant. What is involved here, however, is only a modification of the surface of the aggregates, whereby the clay is not sufficiently modified to allow of homogeneous dispersion in the rubber composition.

Further, it is known to improve the properties of a hydrotalcite by incorporating a small amount of a polymeric material. Challier et al., in J. Mater. Chem., 1994, 4, 367–371, have proposed to incorporate in a hydrotalcite a monolayer or bilayer of a polymeric material between each two layers of hydrotalcite to render the hydrotalcite electrically conductive.

A nanocomposite material according to the invention consists for the most part of the material of the polymeric matrix, comprising at least 50% and preferably at least 70% by weight of such material. Both homopolymers and copolymers can serve as polymeric matrix. It is one of the advantages of the invention that through the choice of the anions of the layered double hydroxide, any polymeric matrix can be modified with a layered double hydroxide. Thus, by providing the appropriate ingredients, for instance in the form of a kit, those skilled in the art are enabled to prepare, for any desired application, a combination of a particular layered double hydroxide and a particular polymeric material, and thereby a desired nanocomposite material.

Polymeric materials suitable to serve as polymeric matrix in a nanocomposite material according to the invention are both poly-adducts and polycondensates. Preferably, the polymeric matrix has a degree of polymerization of at least 20, more preferably of at least 50. In this connection, for a definition of the degree of polymerization, reference is made to P. J. Flory, "Principles of Polymer Chemistry", New York, 1953. Examples are polyolefins, such as polyethylene or polypropylene, vinyl polymers, such as polystyrene, polymethyl methacrylate, polyvinyl chloride, polyvinylidene chloride or polyvinylidene fluoride, polyesters, such as polyethylene terephthalate or polycaprolactone, polycarbonates, polyaryl ethers, polysulfones, polysulfides, polyamides, polyether imides, polyether esters, polyether ketones, polyether ester ketones, polysiloxanes, polyurethanes and polyepoxides. Preferably used are polyolefins, vinyl polymers, polyesters, polycarbonates, polyamides, polyurethanes or polyepoxides, because the properties of these materials show a very strong improvement owing to the presence of a layered double hydroxide.

In a preferred embodiment, a polymeric matrix is go formed from anionic monomeric material. According to this embodiment, anions of the layered double hydroxide are exchanged with anionic monomeric material, from which subsequently the polymeric matrix is formed in the presence of the layered double hydroxide. It has been found that according to this embodiment, a particularly homogeneous distribution of the layered double hydroxide in the polymeric matrix is obtained. Further, it is advantageous that no additional anions for compatibilizing the polymeric matrix and the layered double hydroxide are needed.

As stated, a nanocomposite material according to the invention is based, in addition to a polymeric matrix, on a layered double hydroxide (LDH). This material is a so-called anionic clay, consisting of small crystalline sheets of dimensions of a few nanometers, between which anions are located. By these anions are meant anions other than hydroxyl groups. A layered double hydroxide can be both natural and synthetic in nature. For a description of possible methods of preparation for a synthetic layered double hydroxide, reference is made to U.S. Pat. Nos. 3,539,306 and 3,650,704.

Preferably, the layered double hydroxide has a large contact surface and an ion exchange capacity of 0.5 to 6 milliequivalents per gram. An LDH preferably used is a hydrotalcite or a hydrotalcite-like material, because these materials can be readily prepared synthetically, while the desired properties can be eminently controlled.

Found to be uncommonly suitable are hydrotalcites that satisfy the formula (I):

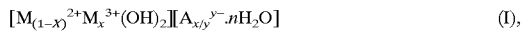

$$[M_{(1-x)}^{2+}M_x^{3+}(OH)_2][A_{x/y}^{y-}.nH_2O] \quad (I),$$

wherein $M^{2+}$ is a bivalent cation, $M^{3+}$ is a trivalent cation, x is a number between 0.15 and 0.5, y is 1 or 2, n is a number from 1 to 10, and A is an anion selected from the group consisting of $Cl^-$, $Br^-$, $NO_3^-$, $SO_4^{2-}$ and $CO_3^{2-}$. The bivalent cation is preferably selected from the group of bivalent magnesium, zinc, nickel, iron, copper, cobalt, calcium and manganese ions and combinations of these bivalent cations Most preferably, the bivalent cation is a magnesium, zinc or calcium ion or a combination thereof. The trivalent cation is preferably selected from the group of trivalent aluminum, chromium, iron, cobalt and manganese ions and combinations of these trivalent cations. Most preferably, the trivalent cation is an aluminum, chromium or iron ion or a combination thereof.

Before a layered double hydroxide can be incorporated in a polymeric matrix for forming a nanocomposite material according to the invention, it should be modified so as to be compatible and/or reactive with the material of the polymeric matrix. To that end, the layered double hydroxide comprises at least 20%, preferably at least 60%, more preferably at least 80%, based on the total number of anions of the layered double hydroxide, of an amount of anions that are reactive and/or compatible with the polymeric matrix. As has already been indicated, these anions can also be anionic monomers from which the polymeric matrix can be formed. The total number of anions on which the specified amounts of reactive and/or compatible anions are based is understood not to include the hydroxyl groups present in the layered double hydroxide.

It is particularly preferred that the layered double hydroxide contains at least 95%, based on the total number of anions of the layered double hydroxide, of an amount of anions that are reactive and/or compatible with the polymeric matrix. It has been found that a very homogeneous dispersion of the layered double hydroxide in the polymeric matrix is obtained when such a large amount of reactive and/or compatible anions is present. This dispersion forms a nanocomposite material having uncommonly favorable properties.

In the preparation of a nanocomposite material according to the invention, it is preferred to grind or pulverize the layered double hydroxide beforehand. Such a pretreatment of the layered double hydroxide enables readier and better mixing of the various ingredients.

When a natural layered double hydroxide is used in a nanocomposite material according to the invention, this natural material will normally not contain the desired compatible and/or reactive anions. Therefore, the anions naturally present in natural hydrotalcites, such as chloride or nitrate ions, can be exchanged for the desired anions. If a synthetic layered double hydroxide is used, the desired anions may already have been introduced in the synthesis of the material. In the case of a synthetic layered double hydroxide, too, of course, the anions that are compatible and/or reactive with the polymeric matrix can be introduced by exchange. The exchange can be carried out in any known manner, for instance as described by Sugahara et al., in Ceramics International, 14(1988), 163–167.

Preferably, the ion exchange is carried out by suspending the layered double hydroxide in water, whereafter the pH of the suspension is reduced to a value of less than 4. Next, the anions with which the intended exchange is to be effected are added to the suspension and the pH is adjusted to a value in excess of 8. It has been found that this procedure leads to a superior exchange product. Further, the procedure can be carried out readily and in a short time.

It has been found that a layered double hydroxide can be modified with anions that are solely compatible, solely reactive, or both, with the polymeric matrix, to obtain a homogeneous dispersion of the layered double hydroxide in the polymeric matrix. Suitable compatible anions can be selected from anions of the formula $RCOO^-$, $ROSO_3^-$ or $RSO_3^-$, wherein R is an alkyl or an alkyl phenyl group having 6 to 22 carbon atoms, or combinations thereof, as well as from anionic monomers from which the polymeric matrix Can be formed. One skilled in the art will be able to select suitable anions for a polymeric material whose properties he seeks to improve by incorporating a layered double hydroxide.

Anions that are reactive with the polymeric matrix likewise satisfy the formula $RCOO^-$, $ROSO_3^-$ or $RSO_3^-$, with the proviso that the alkyl or alkyl phenyl chain comprises a reactive group. This reactive group can be present both attached to a terminal methylene group of the chain and at a different position in the chain. Therefore, the reactive anions satisfy the formula $R'—RCOO^-$, $R'—ROSO_3^-$ or $R'—RSO_3^-$, wherein R is a straight or branched alkyl or an alkyl phenyl group having 6 to 22 carbon atoms and R' is a reactive group selected from the group consisting of hydroxy, amino, epoxy, vinyl, isocyanate, carboxy, hydroxyphenyl and anhydride. The choice of the reactive group can be suitably based by the artisan on the nature of the material of the polymeric matrix. It has been found that a nanocomposite material based on a layered double hydroxide that contains the reactive anions mentioned is exceptionally stable. Depending on the nature of the polymeric matrix, the reactive anions may also be compatible with the polymeric matrix, which yields a still stabler nanocomposite material.

Bringing the ingredients together to form a nanocomposite material according to the invention can be carried out by any suitable method, provided such method yields a good mixing. As stated, the desired anions can be provided in the layered double hydroxide during the synthesis thereof, or subsequently by ion exchange. If these anions are also monomers for forming the polymeric matrix, the layered double hydroxide can optionally be mixed with additional monomeric material in order to obtain the desired ratio of polymeric matrix to layered double hydroxide. Examples of procedures for mixing monomeric material and layered double hydroxide comprise prolonged stirring at elevated temperature and extrusion. Suitable conditions for the mixing depend on the nature of the selected ingredients and can be simply determined by the artisan. Stirring can be carried out, for instance, at a temperature between 40 and 80° C., and the extrusion, for instance, between 40 and 150° C. in an extruder with a double screw.

The polymerization reaction in which the monomeric material, in the presence of the layered double hydroxide, is converted to the polymeric matrix can be carried out in any known manner. It has been found that the presence of the layered double hydroxide hardly, if at all, has any disturbing influence on the polymerization reaction.

The nanocomposite materials according to the invention are particularly suitable to be used for a large variety of applications. The materials are eminently processable and can be shaped in conventional shaping steps, such as injection molding and extrusion processes. Shaped articles of a variety of natures can be manufactured from the present nanocomposite material. Examples comprise any application for which the material of the polymeric matrix is suited. As preferred applications, fibers, packaging materials and construction materials can be mentioned.

The invention will presently be further explained in and by the following example.

EXAMPLE I

Five grams of a hydrotalcite of the general formula $Mg_6Al_2(OH)_{16}CO_3.4H_2O$ with an ion exchange capacity of about 4 mequ./g were suspended, together with 5 g $\alpha,\omega$-amino-undecanoic acid, in 200 ml water. The suspension obtained was stirred at 80° C. for 3 hours. The precipitate that was formed was washed a few times with warm water and freeze-dried in the form of a white powder.

The white powder was mixed with 90 g caprolactam and 10 ml water and slowly heated to 260° C. with stirring and under a dry nitrogenous atmosphere. After a 6-hour polycondensation, a transparent melt of a polyamide-6 was obtained. The transparency of the melt indicated that the hydrotalcite was distributed completely and homogeneously in the polymeric matrix. The material was characterized with the aid of X-ray diffraction. The results showed that exfoliation of the hydrotalcite had occurred, since no reflection as a result of a periodicity of a layered sheet structure was observed.

What is claimed is:

1. A method for preparing a nanocomposite material based on a polymeric matrix and a layered double hydroxide, comprising the steps of:
    a) providing a layered double hydroxide which contains an amount of anions of at least 20%, based on the total number of anions of the layered double hydroxide, which anions are compatible and/or reactive with the polymeric matrix, by ion exchanging the layered double hydroxide with said anions, which ion exchange is carried out by suspending the layered double hydroxide in water, reducing the pH of the suspension to a value of less than 4, adding the anions and adjusting the pH to a value in excess of 8;
    b) mixing the layered double hydroxide with a monomeric material for forming the polymeric matrix, in an amount sufficient to provide the polymeric matrix is present in the nanocomposite material in an amount of at least 50% by weight, based on the nanocomposite material; and
    c) polymerizing the monomeric material for forming the polymeric matrix.

2. A method according to claim 1, wherein the layered double hydroxide is a hydrotalcite or a hydrotalcite-like material.

3. A method according to claim 2, wherein the layered double hydroxide has an ion exchange capacity of 0.5 to 6 milliequivalents per gram and satisfies the formula (I)

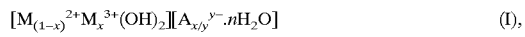

$$[M_{(1-x)}^{2+}M_x^{3+}(OH)_2][A_{x/y}^{y-}.nH_2O] \qquad (I),$$

wherein $M^{2+}$ is a bivalent cation, $M^{3+}$ is a trivalent cation, x is a number between 0.15 and 0.5, y is 1 or 2, n is a number from 1 to 10, and A is an anion selected from the group consisting of $Cl^-$, $Br^-$, $NO_3^-$, $SO_4^{2-}$, and $CO_3^{2-}$.

4. A method according to claim 3, wherein $M^{2+}$ is selected from the group consisting of $Mg^{2+}$, $Zn^{2+}$, $Ni^{2+}$, $Fe^{2+}$, $Cu^{2+}$, $Co^{2+}$, $Ca^{2+}$, $Mn^{2+}$ and combinations thereof.

5. A method according to claim 3, wherein $M^{3+}$ is selected from the group consisting of $Al^{3+}$, $Cr^{3+}$, $Fe^{3+}$, $Co^{3+}$, $Mn^{3+}$ and combinations thereof.

6. A method according to claim 1, wherein the anions which are introduced into the layered double hydroxide in step a) are also the monomeric material for forming the polymeric matrix.

7. A method according to claim 6, wherein the monomeric material is an anionic monomer selected from the group consisting of (meth) acrylates and carboxylic acids.

8. A method according to claim 3, wherein the anions which are compatible and/or reactive with the polymeric matrix are selected from the group consisting of anions of the formula R'—RCOO⁻, R'—ROSO$_3^-$ or R'—RSO$_3^-$, wherein R is a straight or branched alkyl or an alkyl phenyl group having 6 to 22 carbon atoms and R' is a hydrogen atom or a reactive group selected from the group consisting of hydroxy, amino, epoxy, vinyl, isocyanate, carboxy, hydroxyphenyl and anhydride.

9. A method according to claim 8, wherein in step a) an amount of at least 80% based on the total amount of anions of the layered double hydroxide, is exchanged.

10. A method according to claim 1, wherein the polymeric matrix is present in an amount of at least 70% by weight, based on the nanocomposite material.

11. A method according to claim 1, wherein the polymeric matrix has a degree of polymerization of at least 20.

12. A method according to claim 8, wherein the polymeric matrix is selected from the group consisting of polyolefins, vinyl polymers, polyesters, polycarbonates, polyamides, polyurethanes and polyepoxides.

13. A nanocomposite material obtainable by a method according to claim 1.

14. A shaped article of a nanocomposite material according to claim 13.

15. A method according to claim 8, wherein in step a an amount of at least 95% based on the total amount of anions of the layered double hydroxide, is exchanged.

* * * * *